T. C. WILCOX.
DIRIGIBLE HEADLIGHT.
APPLICATION FILED SEPT. 11, 1915.
1,174,645.
Patented Mar. 7, 1916.
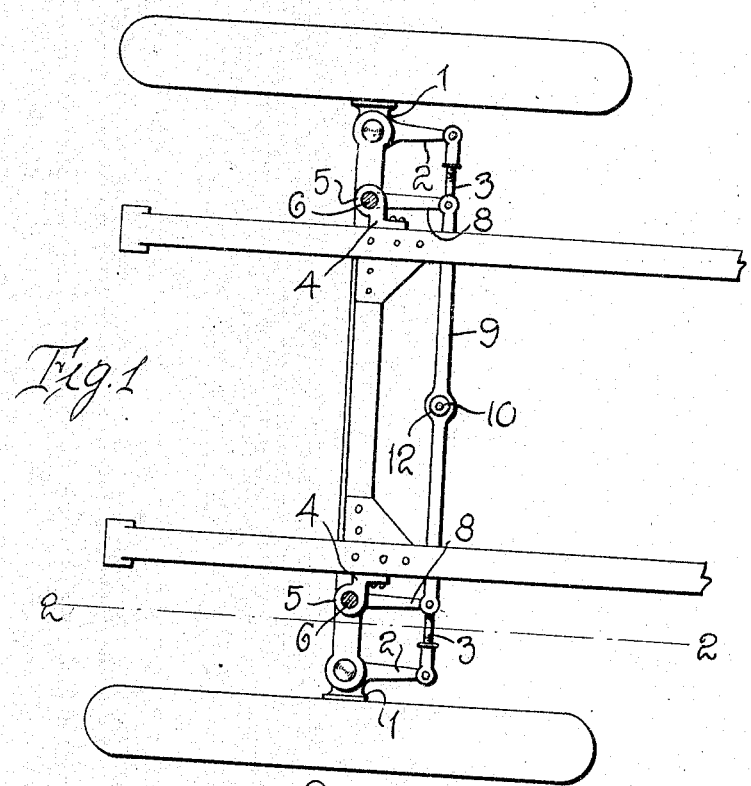
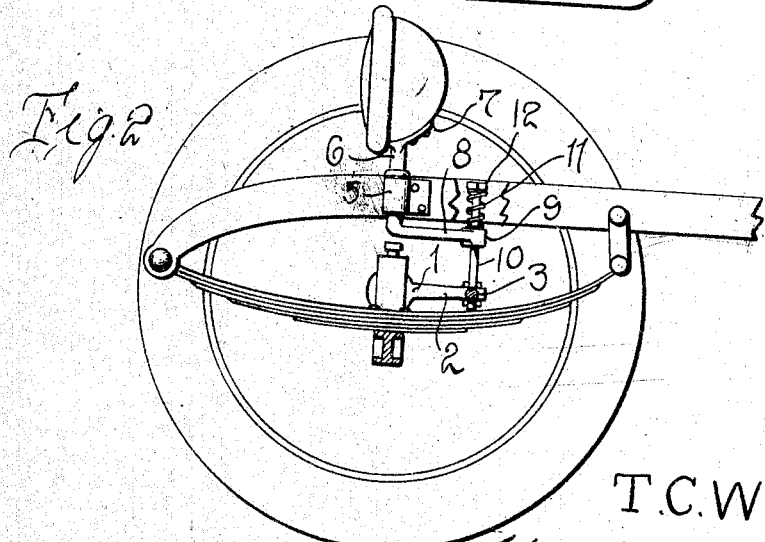
Inventor
T. C. Wilcox
By Watson E. Coleman
Attorney

UNITED STATES PATENT OFFICE.

TIPTON C. WILCOX, OF MURRAY, KENTUCKY.

DIRIGIBLE HEADLIGHT.

1,174,645.  Specification of Letters Patent.  Patented Mar. 7, 1916.

Application filed September 11, 1915. Serial No. 50,253.

*To all whom it may concern:*

Be it known that I, TIPTON C. WILCOX, a citizen of the United States, residing at Murray, in the county of Calloway and State of Kentucky, have invented certain new and useful Improvements in Dirigible Headlights, of which the following is a specification, reference being had to the accompanying drawings.

This invention relates to certain improvements in dirigible headlights and has relations more particularly to a device of this general character especially designed for use on automobiles and it is an object of the invention to provide novel and improved means whereby the headlights are caused to move in unison and in the same general direction as the spindles of the steering wheels.

The invention consists in the details of construction and in the combination and arrangement of the several parts of my improved headlight whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawing, wherein—

Figure 1 is a view, partly in top plan and partly in section, illustrating an embodiment of my invention as herein set forth; and Fig. 2 is a view in side elevation, with parts broken away, illustrating my invention as herein embodied.

As disclosed in the accompanying drawing, 1 denotes the steering spindles of a motor vehicle operatively engaged with the front axle thereof in a conventional manner and having disposed rearwardly thereof the arms 2 with which a conventional steering rod 3 is operatively engaged. 4 denotes oppositely disposed and laterally directed arms carried by the body of the vehicle having their forward faces provided with the vertically disposed sleeves 5 through which may be disposed the shanks 6 of the lamp supporting brackets 7. The shanks 6 extend below the sleeves 5 and said lower extremities are provided with inwardly disposed arms 8 arranged in parallelism and pivotally engaged with the extremities of a rod 9 disposed above the steering rod 3 and vertically spaced relatively thereto and pivotally engaged with said steering rod at its longitudinal center by the pin 10. As herein disclosed, the pin 10 is of such a length as to permit a limited movement of the rod 9 longitudinally thereof, the movement of said rod 9 being under the influence of the expansible member 11 herein disclosed as a conventional coiled spring encircling the pin 10 and interposed between the rod 9 and the stop 12 carried by the upper extremity of the pin. The vertical movement of the rod 9 is to compensate for any vertical play of the brackets 7 which may occur during the travel of the vehicle to which the invention is applied.

It is also to be understood that the pin 10 is detachably engaged with the steering rod 3 so that when required, the rod 9 may be uncoupled from the rod 3 so that the lamp supporting brackets are independent of the movement of the steering rod 3.

From the foregoing description, it is thought to be obvious that a headlight constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

In combination with a vehicle provided with steering spindles, rearwardly directed arms carried by the spindles, a rod operatively engaged with the arms to cause the spindles to rotate in unison, lamp supporting brackets supported by the vehicle for movement about vertical axes and positioned in a plane above the spindles, the lower extremities of the brackets being provided with rearwardly directed arms arranged in parallelism with each other and with the arms of the spindle, a rod positioned above the first named rod and pivotally engaged with the extremities of the arms of the lamp brackets, a vertical pin pivotally connecting said second named rod mid-way of its length with the first named rod, said pin being detachably engaged with the first named rod and extending above the second named rod and terminating in an enlargement, and a coil spring encircling the pin and interposed between the enlargement thereof and the upper face of the second rod.

In testimony whereof I hereunto affix my signature in the presence of two witnesses.

TIPTON C. WILCOX.

Witnesses:
A. D. THOMPSON,
R. H. WILCOX.